Oct. 14, 1969

D. R. GRAY 3,472,641

PROCESS FOR ORNAMENTING GLASS MANUFACTURED
BY THE FLOAT GLASS PROCESS

Filed June 14, 1967

INVENTOR.
DORIAN R. GRAY
BY John R. Faulkner
Glenn S. Arendsen
ATTORNEYS

Oct. 14, 1969   D. R. GRAY   3,472,641
PROCESS FOR ORNAMENTING GLASS MANUFACTURED
BY THE FLOAT GLASS PROCESS
Filed June 14, 1967   2 Sheets-Sheet 2
FIG. 2
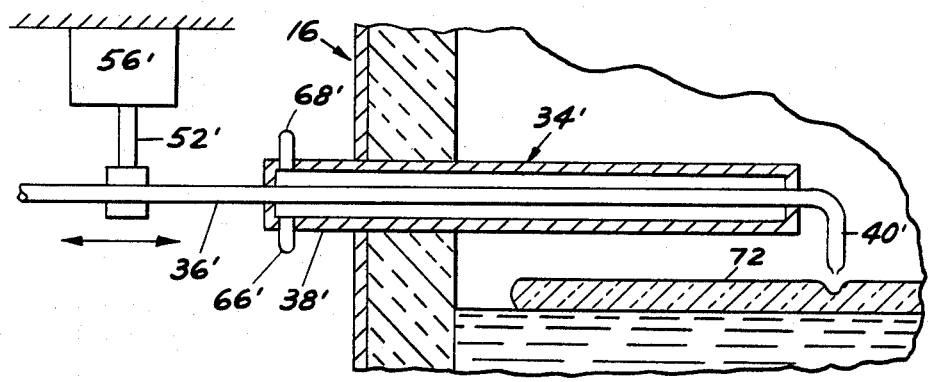
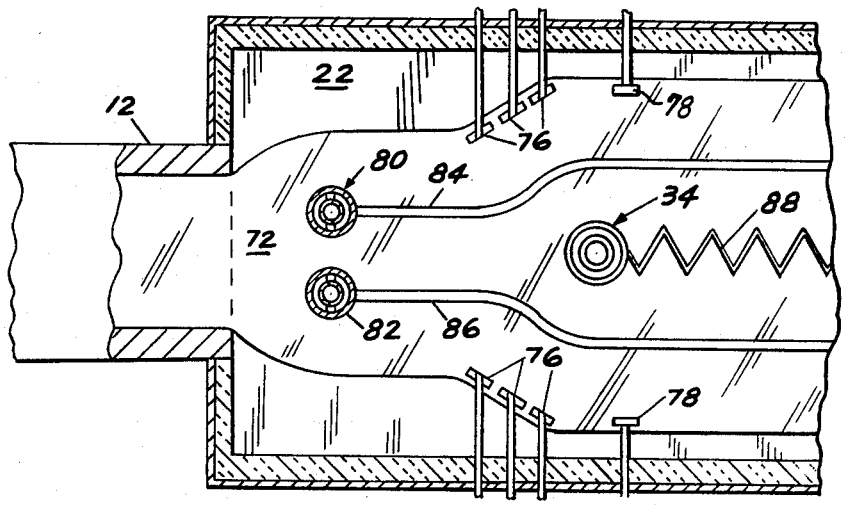
FIG. 3
INVENTOR.
DORIAN R. GRAY
BY John R. Faulkner
Glenn S. Arendsen
ATTORNEYS

United States Patent Office 3,472,641
Patented Oct. 14, 1969

3,472,641
PROCESS FOR ORNAMENTING GLASS MANUFACTURED BY THE FLOAT GLASS PROCESS
Dorian R. Gray, Nashville, Tenn., assignor to Ford Motor Company, Dearborn, Mich., a corporation of Delaware
Filed June 14, 1967, Ser. No. 645,939
Int. Cl. C03b *17/02, 18/02;* C03c *17/26*
U.S. Cl. 65—60                                    6 Claims

ABSTRACT OF THE DISCLOSURE

Gas outlets positioned in the float chamber above the surface of glass being produced by the float process direct gas at the moving glass while the glass is soft enough to displace portions of the surface. The glass then is cooled with the portions displaced to produce patterns or configurations in the surface. Mechanisms are provided to move the gas outlets laterally relative to the moving glass to produce changing configurations. Colored configurations are produced by injecting powdered coloring materials into the gas.

SUMMARY OF THE INVENTION

In the manufacture of glass by the float process, a continuous ribbon of heat softened glass is formed on the surface of a molten bath contained in a chamber. Previously filed U.S. patent application Ser. Nos. 482,510 filed Aug. 25, 1965, now abandoned, and 572,497 filed Aug. 15, 1966, assigned to the assignee of this application and incorporated herein by this reference, disclose processes for laterally stretching the ribbon during the float process by positioning mechanical rollers along the edges of the glass and by directing gas laterally outward near the edges respectively. In each of these processes a wide sheet of glass having a smooth surface in the central area thereof is produced.

This invention provides a process for figuring the surface of the central area of the glass during the float process that comprises forming a continuous ribbon of heat softened glass on a molten metal bath, drawing the ribbon across the bath while cooling the ribbon into a structurally integral sheet, positioning a gas outlet above the surface of the ribbon, and applying gas to the ribbon from the outlet to displace portions of the glass surface. The glass is cooled while the portions are displaced to produce the desired configurations in the surface.

As used in this application, the terms "figuring" and "configurations" refer to contours in the glass surface or changes in appearance as by coloring the glass. The central area of the ribbon refers to the area of the ribbon remaining after the edges are trimmed off; thus, the central area is the glass ultimately used or sold. The phrase "structurally integral" refers to glass sheets cooled sufficiently to be contacted by normal mechanical rollers without marring or other damage.

Rigidly fixing the gas outlets relative to the float chamber produces glass having a straight longitudinal channel in its surface. Mechanisms capable of moving the gas outlets laterally or longitudinally relative to the glass according to a controlled program produce varying configurations in the glass surface. Ordinarily, the gas outlets are normal to the glass surface but mechanisms capable of changing the angle of the gas outlet relative to the surface can be included to produce other configurations. The depth of the configuration in the glass is changed by varying the velocity of the gas issuing from the gas outlet or the distance of the gas outlet from the glass surface.

BRIEF DESCRIPTION OF THE DRAWINGS

FIGURE 2 is a sectional view of an alternate embodiment in which a gas nozzle is positioned in the side wall of the chamber. FIGURE 3 is a plan view of the float chamber showing various positions of multiple gas outlets and the configurations produced thereby.

DETAILED DESCRIPTION

Figure 1:
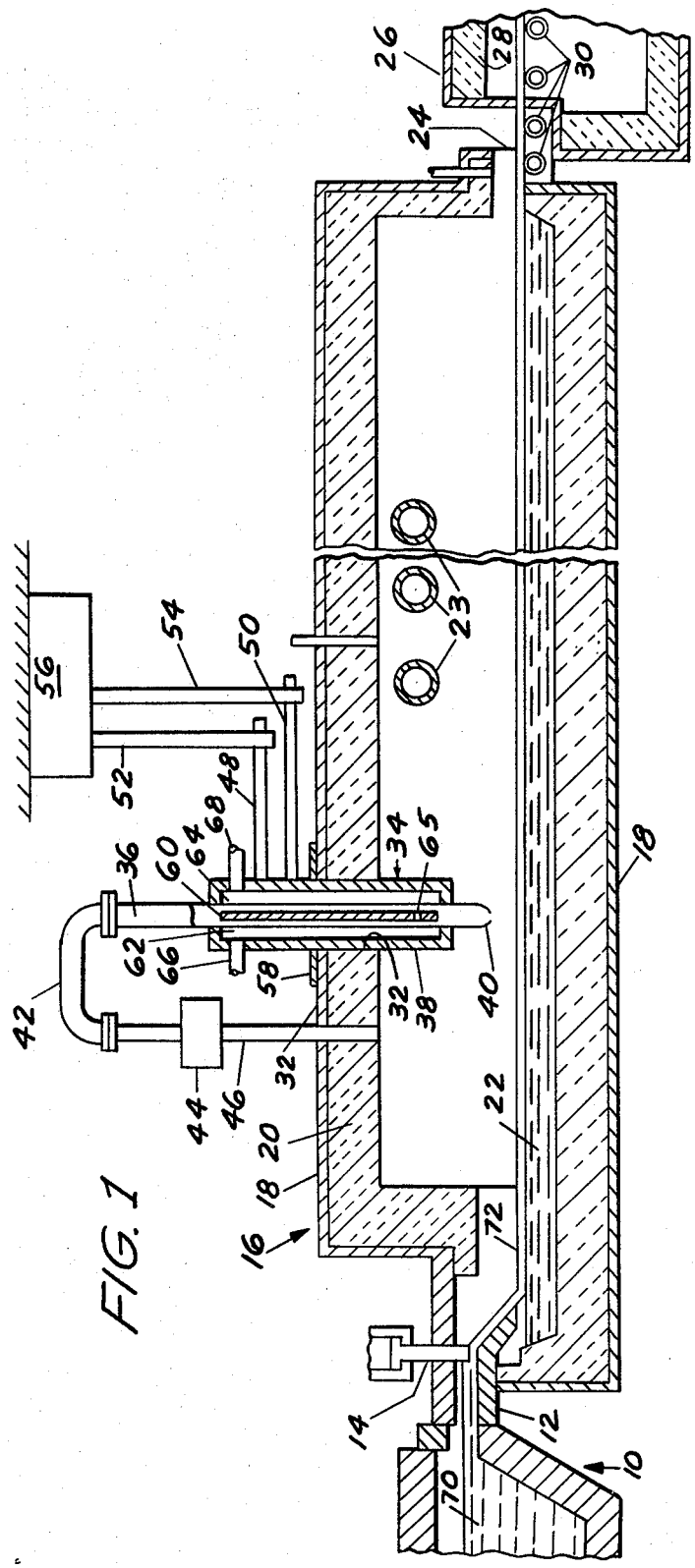
FIGURE 1 is a side sectional view of a float glass chamber including portions of the delivery end of a glass melting furnace at the left end and the annealing lehr at the right end. A movable nozzle that serves as the gas outlet is shown in the roof of the float glass chamber.

Referring to FIGURE 1, the end of a glass melting and refining furnace is represented by the numeral 10. A spout 12 having a tweel 14 positioned therein connects furnace 10 with the interior of a float chamber represented by numeral 16. Float chamber 16 is similar to the float chamber described in Basler et al. U.S. patent application Ser. No. 404,247 filed Oct. 16, 1964, now Patent No. 3,332,763, the disclosure of which is incorporated herein by this reference, and comprises an enclosed housing 18 that is lined with refractory material 20. Molten metal 22 such as tin covers the bottom of the interior of chamber 16 and cooling coils 23 pass through the right hand portion of housing 18 above the level of molten metal 22.

An exit opening 24 connects the interior of chamber 16 with the entrance to an annealing lehr 26. Lehr 26 also is lined with refractory material 28 and a series of power driven conveyor rolls 30 are located in exit 24 and annealing lehr 26.

A slot 32 cut into the roof of chamber 16 has a gas nozzle assembly 34 positioned therein. Nozzle assembly 34 comprises a gas conduit 36 extending through a housing 38 that is movable in slot 32. Conduit 36 terminates within the interior of float chamber 16 in the form of a nozzle 40. The upper end of conduit 36 is connected through a flexible tube 42 to the outlet of a pump 44 that has its inlet connected to a pipe 46 communicating with the interior of chamber 16 near the roof thereof.

Two arms 48 and 50 are fastened rigidly to housing 38 and project horizontally therefrom. The outer ends of arms 48 and 50 are fastened rotatably to levers 52 and 54, respectively, that project downwardly from a power mechanism 56. Power mechanism 56 is fastened rigidly relative to float chamber 16 and contains an electric motor that drives cams bearing on levers 52 and 54 in a manner capable of producing the motion described later.

Housing 38 passes movably through a plate 58 that is slidably located on the top of chamber 16 and is sufficiently large to cover slot 32 for all positions of housing 38. A baffle 60 longitudinally bisects the interior of housing 38 into two portions numbered 62 and 64. Portions 62 and 64 communicate with each other through appropriate holes 65 in the lower part of baffle 60, and tubes 66 and 68 positioned in the upper part of housing 38 connect respective portions 62 and 64 with a means (not shown) capable of circulating a cooling medium through housing 38 to cool conduit 36 and nozzle 40.

Operation of FIGURE 1

Furnace 10 contains a quantity of molten glass 70 having a temperature of about 2300° F. Spout 12 delivers a ribbon 72 of molten glass 70 onto the surface of molten metal 22 in float chamber 16, with the quantity of glass in ribbon 72 being controlled by the position of tweel 14. Ribbon 72 moves to the right along the surface of molten metal 22 under the longitudinal force exerted thereon by rolls 30, and as it moves it is cooled by coolant passing through coils 23. When the ribbon reaches exit 24, it has been cooled to a structurally integral glass sheet. Power driven rolls 30 pull the ribbon into lehr 26 where the glass is annealed in a conventional manner.

Pump 44 draws the atmosphere existing in the interior of chamber 16 from the top thereof and discharges the atmosphere through nozzle 40 onto the central area of ribbon 72. A typical atmosphere consists essentially of a major portion of nitrogen with minor amounts (about 4 percent) of reducing gases such as hydrogen or carbon monoxide. Preferably the atmosphere contains no more than trace amounts of oxygen, carbon monoxide and water vapor, and means for removing the latter gases can be included in the circulating system for nozzle 40. The atmosphere issuing from nozzle 40 impinges on the ribbon to displace portions of its surface.

Power mechanisms 56 moves levers 52 and 54 laterally and levers 52 and 54 act through arms 48 and 50 to move nozzle assembly 34 laterally in slot 32. This lateral movement of assembly 34 produces a wavy configuration in the surface of the ribbon as shown in FIGURE 3. Other configurations can be produced by holding one of levers 52 and 54 stationary in which case nozzle assembly 34 pivots in a vertical plane about that lever. Alternatively, levers 52 and 54 and arms 48 and 50 can be moved so the nozzle assembly pivots in a lateral or longitudinal plane, or the levers can move vertically to move the nozzle assembly toward or away from the glass surface to produce configurations of varying depth. Depth variations also can be produced by varying the velocity of the gases issuing from the nozzles.

Water usually is used as a cooling medium circulating through housing 38 to cool nozzle 40 and in coils 23 to cool the central area and edges of the ribbon. Temperature variations in the gas issuing from nozzle 40 also can be used to produce configuration variations if desired, and these temperature variations are readily produced through the heat exchanging system in the nozzle assembly. Cooling of nozzle assembly 34 can be accomplished without an external coolant by bleeding some of the gas passing through conduit 36 from openings near the lower end of housing 38 and conducting this gas back into the intake of pump 44.

Turning now to FIGURE 2, a nozzle assembly 34' projects horizontally through the side wall of chamber 16. Nozzle assembly 34' is identical to nozzle assembly 34 except conduit 36' turns downwardly at its inner end so nozzle portion 40' is directed at the surface of the ribbon. Outside of housing 38', conduit 36' is attached to a lever 52' projecting from a power mechanism 56'.

Gas issuing from nozzle portion 40' forms a channel 74 in the surface of the central area of ribbon 38. Power mechanisms 56' moves lever 52' as indicated by the arrow to thereby move nozzle assembly 34' laterally across the sheet for a wavy configuration.

FIGURE 3 shows the effect of combining a movable nozzle assembly 34 located above a laterally stretched glass ribbon with stationary nozzles located upstream of lateral stretching. In FIGURE 3 the molten glass issuing from spout 12 is permitted to attain an equilibrium thickness while floating on molten metal 22 and then is laterally stretched by gas issuing from gas outlets 76 as disclosed in U.S. Ser. No. 572,497. Knurled rollers 78 positioned at each edge of the ribbon downstream of outlet 76 prevent the transmission of longitudinal stretching forces applied by power driven rolls 30 to the molten glass issuing from spout 12 and also impart some vertical stability to the glass sheet.

Positioned in the roof of chamber 16 above the molten glass upstream of gas outlets 76 are two nozzle assemblies 80 and 82. Nozzle assemblies 80 and 82 are identical to assembly 34 but are stationary relative to chamber 16. Gas issuing from the nozzle portions of assemblies 80 and 82 displace portions of the glass sheet as represented by numerals 84 and 86. As the glass is stretched laterally by gas outlets 76, displaced portions 84 and 86 move toward the edges of the glass sheet and are widened. In addition, the outlines of displaced portions 84 and 86 are smoothed considerably because of the softness of the ribbon upstream of outlets 76 so nozzle assemblies 80 and 82 are used only to produce subtle configurations in the glass surface. Movable nozzle assembly 34 positioned downstream of fluid outlets 76 produces a wavy configuration represented by numeral 88 that is much sharper than the configurations resulting from displaced portions 84 and 86.

The nozzle portions useful in this invention can be of any shape or size depending on the configuration desired. For example, in addition to the pointed nozzle portions that produce the channels shown, flared nozzle portions can be used to produce wider and smoother configurations. Instead of issuing gas from the nozzle portions, the nozzle portions can draw gas across the surface of the glass to produce raised configurations.

Coloring can be added to the decorative configurations by injecting color producing materials into the gas. Useful color producing materials are the oxides of the transition elements (i.e., titanium, vanadium, chromium, iron, nickel, copper) which produce color by absorbing certain light frequencies when in solution in the glass, or colored materials such as the selenium reds. These materials are finely powdered and injected into the gas issuing from the gas outlet at predetermined rates. The glass can be colored without configurations by applying the color producing materials to the glass surface just downstream of spout 10 where the glass is sufficiently soft to obliterate the physical configurations produced by the gas, or by reheating the central area of the ribbon to a temperature sufficient for obliteration.

Thus, this invention provides a process for producing various configurations in glass being manufactured by the float glass process by applying the gas atmosphere existing in the float chamber to the surface of the softened glass. The configurations usually are decorative but can be functional to aid in further processing of the glass; for example, grooves approximately $\frac{1}{16}''$ wide are useful in producing sharp bends in the glass, and a wide, smooth depression can be used in producing the corner portion of a warp-around windshield. Colored configurations can be produced by adding powdered coloring material to the gas.

What is claimed is:

1. A process for ornamenting the central area of the surface of glass during its manufacture by the float process comprising forming a continuous ribbon of heat softened glass on a molten metal bath, drawing said ribbon across the bath while cooling the ribbon into a structurally integral sheet, positioning a gas outlet above the surface of said ribbon, impinging a stream of gas on the surface of the central area of the ribbon by means of said outlet to configure portions of the surface of the ribbon, and cooling the central area of the glass while the portions ar configured to produce a structurally integral glass sheet.

2. The process of claim 1 comprising moving the gas outlet laterally relative to the moving surface of the ribbon to produce a changing configuration.

3. The process of claim 2 comprising changing the angle of the gas outlet relative to the surface of the ribbon to produce a changing configuration.

4. The process of claim 3 comprising laterally stretching the ribbon of glass while on the molten metal bath prior to the step of applying gas to the surface of the central area of the glass to configure portions thereof.

5. The process of claim 4 whereby the glass is colored by injecting coloring materials into the gas issuing from the gas outlet to produce colored configurations.

6. The process of claim 1 whereby the glass is colored by injecting coloring materials into the gas issuing from the gas outlet to produce colored configurations.

(References on following page)

References Cited

UNITED STATES PATENTS 720,517  2/1903  Frink et al. _____ 65—193

FOREIGN PATENTS 732,043  2/1943  Germany.

S. LEON BASHORE, Primary Examiner

JOHN H. HARMAN, Assistant Examiner

U.S. Cl. X.R.

65—30, 66, 81, 90, 91, 182, 93; 117—124